United States Patent
Kobayashi et al.

(10) Patent No.: US 11,924,061 B2
(45) Date of Patent: Mar. 5, 2024

(54) REQUIRED COMMUNICATION QUALITY ESTIMATION APPARATUS, REQUIRED COMMUNICATION QUALITY ESTIMATION METHOD AND PROGRAM

(71) Applicant: NIPPON TELEGRAPH AND TELEPHONE CORPORATION, Tokyo (JP)

(72) Inventors: Masahiro Kobayashi, Musashino (JP); Yuka Komai, Musashino (JP); Shigeaki Harada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/596,024

(22) PCT Filed: Jun. 5, 2019

(86) PCT No.: PCT/JP2019/022376
§ 371 (c)(1),
(2) Date: Dec. 2, 2021

(87) PCT Pub. No.: WO2020/245948
PCT Pub. Date: Dec. 10, 2020

(65) Prior Publication Data
US 2022/0321428 A1 Oct. 6, 2022

(51) Int. Cl.
*H04L 47/2483* (2022.01)
*H04L 41/5009* (2022.01)

(52) U.S. Cl.
CPC ...... *H04L 41/5009* (2013.01); *H04L 47/2483* (2013.01)

(58) Field of Classification Search
CPC .................. H04L 41/5009; H04L 47/2483
See application file for complete search history.

(56) References Cited

U.S. PATENT DOCUMENTS

| 9,088,508 B1* | 7/2015 | Caputo, II .......... H04L 63/1416 |
| 2003/0055920 A1* | 3/2003 | Kakadia .............. H04L 41/5022 709/224 |

(Continued)

FOREIGN PATENT DOCUMENTS

| JP | 2003-209572 | 7/2003 |
| JP | 5747393 | 7/2015 |

(Continued)

OTHER PUBLICATIONS

Yuka Komai et al., "Traffic Prediction by Extracting Users' Access Patterns for Proactive Controlled Network" 2019 IEICE General Conference Correspondence Lecture Proceedings 2, Mar. 19, 2019.

(Continued)

*Primary Examiner* — Lesa M Kennedy
(74) *Attorney, Agent, or Firm* — IPUSA, PLLC

(57) ABSTRACT

A requested communication quality estimation device estimating a requested communication quality for a macroflow, which is a set of microflows, includes a first estimation unit configured to estimate a requested communication quality for each of a plurality of microflows constituting a macroflow, and a second estimation unit configured to estimate a requested communication quality for the macroflow based on the requested communication quality for each of the plurality of microflows which is obtained by the first estimation unit.

9 Claims, 10 Drawing Sheets

(56) References Cited

U.S. PATENT DOCUMENTS

| | | | |
|---|---|---|---|
| 2009/0310491 A1* | 12/2009 | Ginsberg | H04L 43/50 |
| | | | 370/241 |
| 2010/0054126 A1 | 3/2010 | Kwan et al. | |
| 2011/0096666 A1* | 4/2011 | Davari | H04L 47/32 |
| | | | 370/235 |
| 2013/0301481 A1 | 11/2013 | Inoue | |
| 2015/0163147 A1 | 6/2015 | Li et al. | |
| 2016/0080206 A1 | 3/2016 | Prakash et al. | |
| 2017/0222905 A1 | 8/2017 | Leroux et al. | |
| 2018/0048620 A1 | 2/2018 | Inoue et al. | |
| 2018/0279261 A1 | 9/2018 | Kobayashi et al. | |

FOREIGN PATENT DOCUMENTS

| | | |
|---|---|---|
| JP | 2016-541198 | 12/2016 |
| JP | 6347431 | 6/2018 |
| JP | 6470426 | 2/2019 |
| WO | 2012/073404 | 6/2012 |

OTHER PUBLICATIONS

Ministry of Internal Affairs and Communications, Report of "Study Group on Quality Requirements for 0AB-J IP Phones": Dec. 16, 2014, http://www.soumu.go.jp/main_content/000327636.pdf.

Manabu Kato and Kenji Kawahara, "A Flow Allocation Algorithm for TE in Scale-FreeNetworks" IEICE Technical Report, vol. 117, No. 460, 2018, pp. 33-38.

Yousuke Takahashi et al. "A Generating Method of Macroflow for Flow-based Routing" IEICE Technical Report vol. 113, No. 443, 2014.

* cited by examiner

[MACROFLOW CONFIGURATION INFORMATION]
- MACROFLOW 1
  - MICROFLOW 1
  - MICROFLOW 2
- MACROFLOW 2
  - MICROFLOW 3
  - MICROFLOW 4

[MACROFLOW CONFIGURATION INFORMATION + SERVICE INFORMATION]
- MACROFLOW 1
  - MICROFLOW 1: SERVICE A
  - MICROFLOW 2: SERVICE B
- MACROFLOW 2
  - MICROFLOW 3: SERVICE C
  - MICROFLOW 4: SERVICE C

[INDIVIDUAL SERVICE REQUESTED COMMUNICATION QUALITY]
- SERVICE A : 20 Mbps, 5 ms
- SERVICE B : 30 Mbps, 10 ms
- SERVICE C : 100 Mbps, 20 ms

[MACROFLOW CONFIGURATION INFORMATION + MICROFLOW REQUESTED COMMUNICATION QUALITY]
- MACROFLOW 1
  - MICROFLOW 1 : 20Mbps, 5ms
  - MICROFLOW 2 : 30Mbps, 10ms
- MACROFLOW 2
  - MICROFLOW 3 : 100Mbps, 20ms
  - MICROFLOW 4 : 100Mbps, 20ms 110 — MICROFLOW REQUESTED COMMUNICATION QUALITY ESTIMATION UNIT
113 — INDIVIDUAL SERVICE REQUESTED COMMUNICATION QUALITY DB
112 — MATCHING UNIT
114 — SERVICE IDENTIFICATION UNIT

Fig. 4

REQUIRED COMMUNICATION QUALITY ESTIMATION APPARATUS, REQUIRED COMMUNICATION QUALITY ESTIMATION METHOD AND PROGRAM

TECHNICAL FIELD

The present disclosure relates to a technique for estimating a requested communication quality for each of a plurality of generated macroflows in a network capable of performing path setting in units of macroflow which is a set of arbitrary traffic flows between between a source node and a destination node.

BACKGROUND ART

In recent years, a software defined network (SDN) technique, represented by Open Flow, has been introduced in communication networks. In an SDN, a flow can be defined by any combination of header information such as a departure/arrival IP address of a packet, a departure/arrival port number, and a protocol number, and a path can be controlled in units of flow.

In addition, a controller is capable of centrally controlling nodes in a network by software, and thus it is possible to achieve control with a finer granularity and in a shorter time period than in traffic control in the related art such as OSPF.

On the other hand, nodes and a controller need to hold path information in units of flow, and the number of pieces of information to be managed becomes enormous. For this reason, it is assumed that application to a large-scale network is difficult. Thus, a technique for controlling traffic with a granularity larger than an individual flow and smaller than the same target network address has been proposed (Patent Literature 1, Non Patent Literature 1).

Specifically, some flows are aggregated from a flow set having the same departure/arrival network addresses, and a path is controlled in units of aggregated flow group. Hereinafter, an individual flow is referred to as a microflow, and an aggregated flow group is referred to as a macroflow. In the technique of Patent Literature 1, a macroflow is generated so that a time-series variation in a traffic amount is reduced. Further, in Non Patent Literature 2, a macroflow is generated so that requested communication qualities are similar.

CITATION LIST

Patent Literature

Patent Literature 1: JP 5747393 B
Patent Literature 2: JP 6470426 B
Patent Literature 3: JP 6347431 B

Non Patent Literature

Non Patent Literature 1: Komai et al., "Traffic Prediction Method Based on Access Pattern for Realizing a Proactive Controlled Network," IEICE General Meeting, March 2019.
Non Patent Literature 2: Ministry of Internal Affairs and Communications, "Study Group on Quality Requirements for 0AB-J IP Phones' Report," http://www.soumu.go.jp/main_content/000327636.pdf.

SUMMARY OF THE INVENTION

Technical Problem

However, while a macroflow can be generated according to the above-described related art, a requested communication quality (a requested band, a requested delay, and the like) for each of a plurality of macroflows is not estimated. On the other hand, a traffic control technique (Patent Literature 2) calculates path assignment to satisfy a requested communication quality in units of control. In a case where a requested communication quality for each of a plurality of macroflows is not apparent, path assignment that does not take a requested communication quality into account is performed, and thus there is a possibility that the communication quality of a flow will be greatly reduced.

The present disclosure is contrived in view of the above-described circumstances, and an object thereof is to provide a technique capable of estimating a requested communication quality for each of a plurality of macroflows.

Means for Solving the Problem

According to the disclosed technique, there is provided a requested communication quality estimation device that estimates a requested communication quality for a macroflow which is a set of microflows, the requested communication quality estimation device including a first estimation unit configured to estimate a requested communication quality for each of a plurality of microflows constituting a macroflow, and a second estimation unit configured to estimate a requested communication quality for the macroflow based on the requested communication quality for each of the plurality of microflows which is obtained by the first estimation unit.

Effects of the Invention

According to the disclosed technique, a technique capable of estimating a requested communication quality for each of a plurality of macroflows is provided.

BRIEF DESCRIPTION OF DRAWINGS

FIG. 4 is a diagram illustrating an operation example 2 of the microflow requested communication quality estimation unit.

DESCRIPTION OF EMBODIMENTS

Hereinafter, an embodiment of the present disclosure (the present embodiment) will be described with reference to the drawings. The embodiment to be described below is merely an example, and embodiments to which the present disclosure is applied are not limited to the following embodiment.

In the present embodiment, a technique for estimating a requested communication quality of an entire macroflow from information of microflows constituting the macroflow will be described.

Overall Configuration of System

Figure 1:
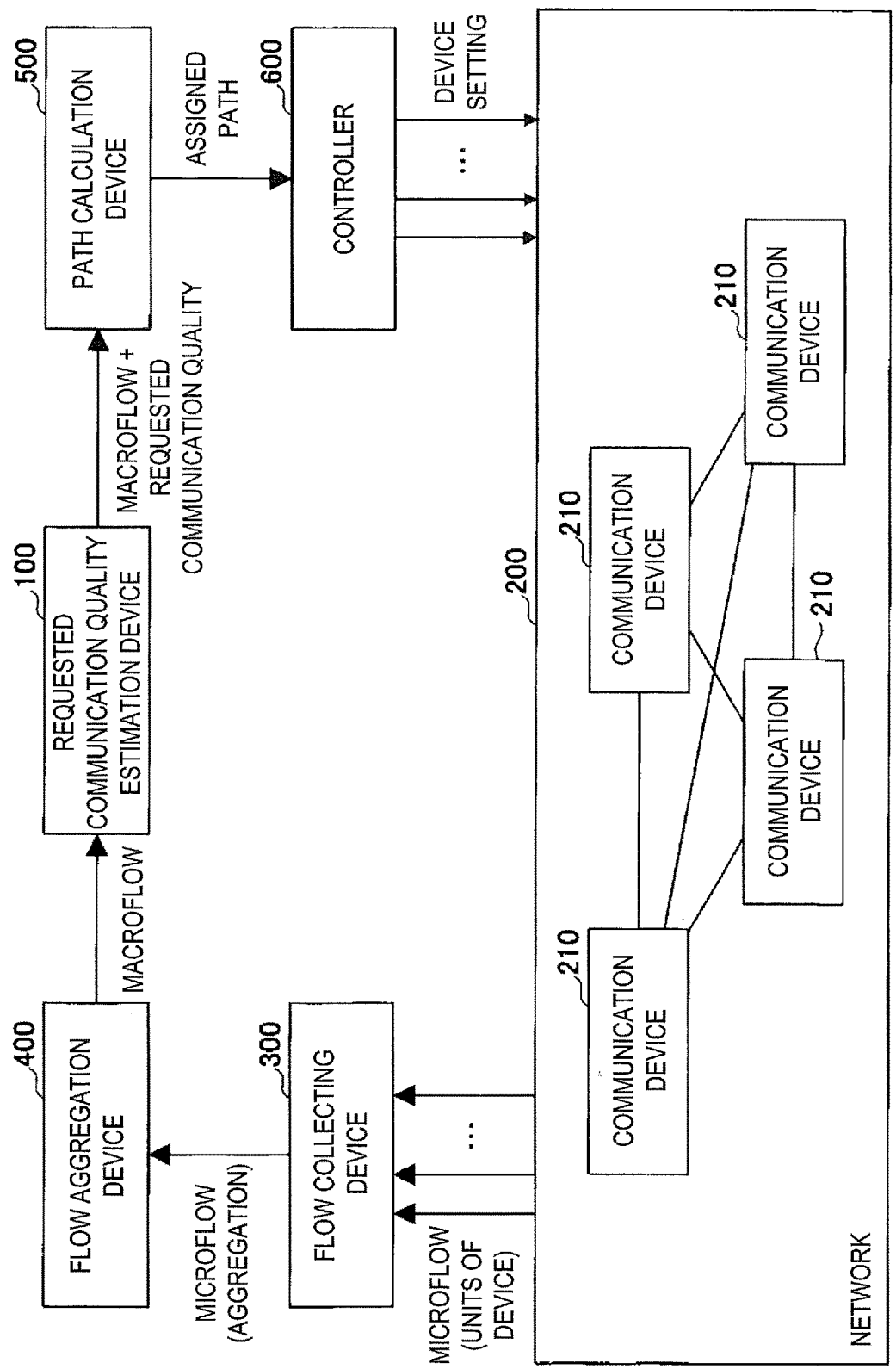
FIG. 1 is a diagram illustrating an overall system configuration.

FIG. 1 illustrates an overall configuration of a communication system in an embodiment of the present disclosure. As illustrated in FIG. 1, the communication system according to the present embodiment includes a requested communication quality estimation device 100, a network 200, a flow collecting device 300, a flow aggregation device 400, a path calculation device 500, and a controller 600, and is capable of performing communication between devices as illustrated in the drawing.

The network 200 is constituted by a plurality of communication devices 210 to be controlled. The communication devices 210 are devices that collect traffic information and transfer traffic such as routers or switches.

The flow collecting device 300 collects and accumulates microflow information acquired by the communication devices 210. The flow aggregation device 400 reads the microflow information accumulated in the flow collecting device 300 and generates a macroflow. For example, a device proposed in Patent Literature 1, Non Patent Literature 1, or the like can be used as the flow aggregation device 400.

The requested communication quality estimation device 100 is a device related to the present disclosure, and estimates a requested communication quality from macroflow information. The path calculation device 500 calculates a path to be assigned to a macroflow from macroflow information and requirements. For example, a device proposed in Patent Literature 2 or the like can be used as the path calculation device 500. The controller 600 sets transfer information of traffic to the communication devices 210 based on an assigned path of a macroflow.

Next, a configuration and operations of the requested communication quality estimation device 100 will be described.

Outline of Configuration and Operations of Requested Communication Quality Estimation Device 100

Figure 2:
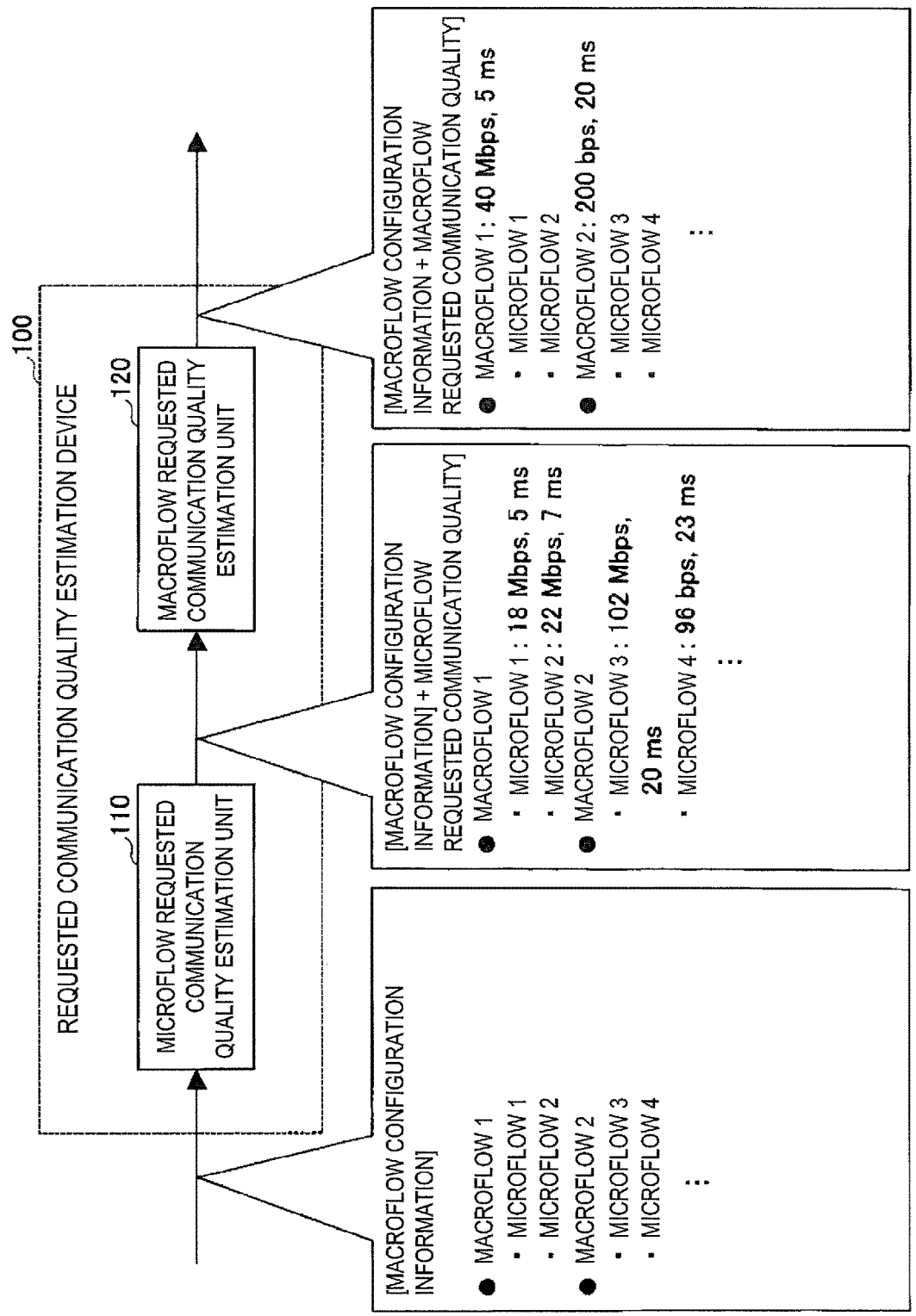
FIG. 2 is a configuration diagram of a requested communication quality estimation device.

FIG. 2 illustrates a configuration example of the requested communication quality estimation device 100. As illustrated in FIG. 2, the requested communication quality estimation device 100 includes two modules, that is, a microflow requested communication quality estimation unit 110 and a macroflow requested communication quality estimation unit 120. Note that the microflow requested communication quality estimation unit 110 may be referred to as a first estimation unit, and the macroflow requested communication quality estimation unit 120 may be referred to as a second estimation unit.

The microflow requested communication quality estimation unit 110 estimates the communication quality of each of a plurality of microflows constituting a macroflow. In the example illustrated in FIG. 2, the microflow requested communication quality estimation unit 110 inputs macroflow configuration information, estimates requested communication qualities for microflows 1 to 4 that constitute macroflows 1 to 2, and outputs macroflow configuration information and microflow requested communication qualities. In the present embodiment, a requested communication quality includes a requested band and a requested delay, but may be something other than the requested band and the requested delay.

The macroflow requested communication quality estimation unit 120 estimates a requested communication quality for the entire macroflow from requested communication qualities for respective microflows constituting the macroflow. In the example illustrated in FIG. 2, the macroflow requested communication quality estimation unit 120 inputs macroflow configuration information and microflow requested communication qualities, and outputs the macroflow configuration information and macroflow requested communication qualities. Specifically, the macroflow requested communication quality estimation unit 120 estimates the requested communication quality for the macroflow 1 from the requested communication qualities for the microflows 1 to 2, and estimates the requested communication quality for the macroflow 2 from the requested communication qualities for the microflows 3 to 4.

Hereinafter, configurations and operation examples of the modules will be described in detail.

Operation Example 1 of Microflow Requested Communication Quality Estimation Unit 110

First, an operation example 1 of the microflow requested communication quality estimation unit 110 will be described with reference to FIG. 3. In the operation example 1, requested communication quality for a microflow is estimated based on a requested communication quality reported from a communication source.

Figure 3:
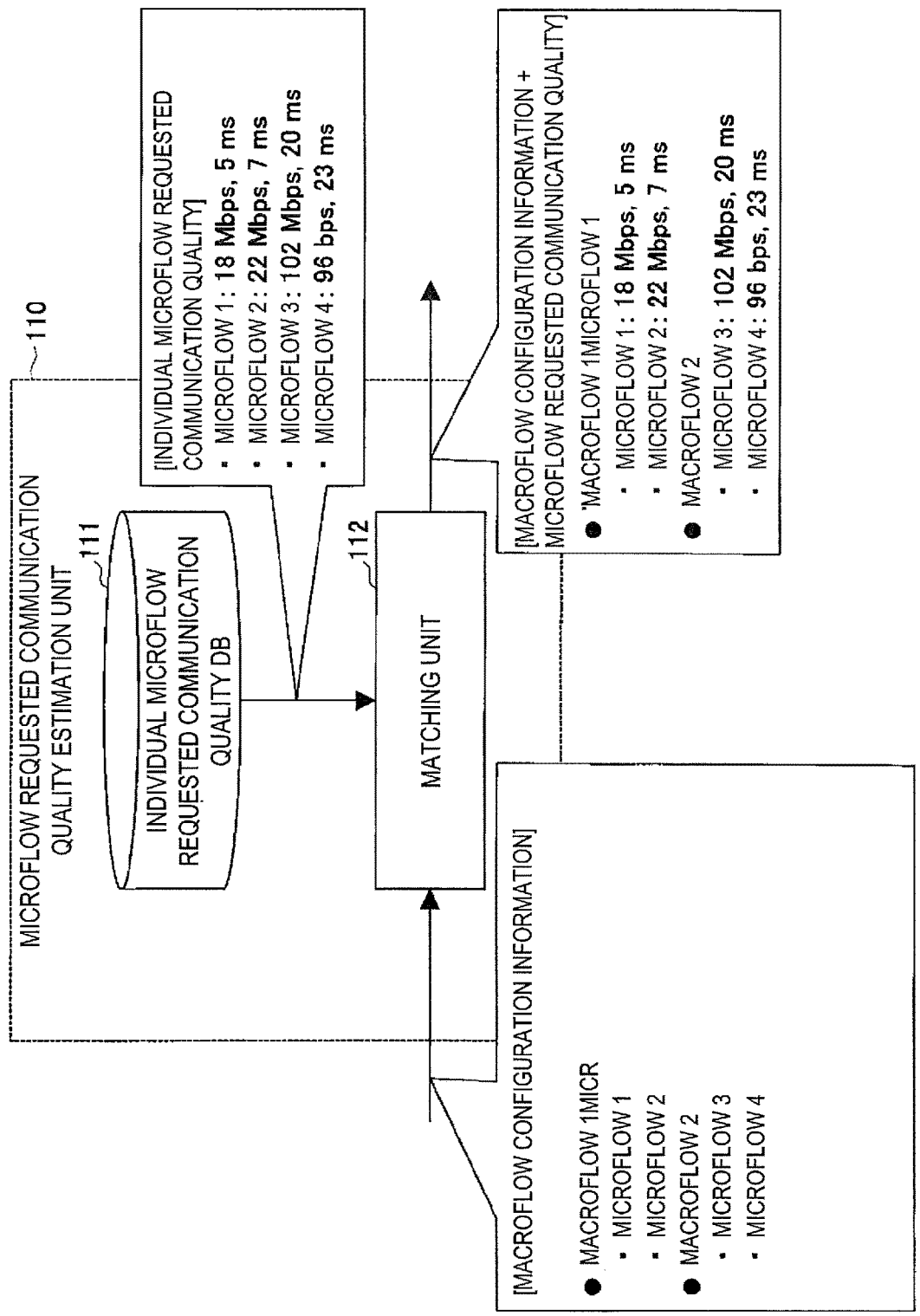
FIG. 3 is a diagram illustrating an operation example 1 of a microflow requested communication quality estimation unit.

As illustrated in FIG. 3, the microflow requested communication quality estimation unit 110 executing the operation example 1 includes an individual microflow requested communication quality database (DB) 111 and a matching unit 112.

The individual microflow requested communication quality DB 111 stores a requested communication quality for each microflow reported from a communication source. The matching unit 112 matches information of microflows constituting a macroflow and communication quality acquired from the individual microflow requested communication quality DB 111, and outputs a requested communication quality for each microflow of each macroflow. In the example in FIG. 3, the requested communication quality reported from a communication source of the microflow 1 is 18 Mbps and 5 ms, and thus the requested communication quality of the microflow 1 constituting the macroflow 1 is 18 Mbps and 5 ms.

Operation Example 2 of Microflow Requested Communication Quality Estimation Unit 110

Next, an operation example 2 of the microflow requested communication quality estimation unit 110 will be described with reference to FIG. 4. In the operation example 2, a requested communication quality for a microflow is estimated based on a service of a communication destination.

As illustrated in FIG. 4, the microflow requested communication quality estimation unit 110 that executes the operation example 2 includes an individual service requested communication quality DB 113, a service identification unit 114, and the matching unit 112.

The service identification unit 114 inputs macroflow configuration information, and estimates a usage service for each of a plurality of microflows constituting a macroflow from a communication destination IP address. For a service identification method, for example, the related art such as Patent Literature 3 may be used.

When the technique disclosed in Patent Literature 3 is used, the service identification unit 114 can determine a domain name of a service of a microflow from a communication destination IP address constituting the microflow. A service can be identified by a domain name.

A requested communication quality for each service is stored in the individual service requested communication quality DB 113. A method of obtaining a requested communication quality for each service will be described later. The matching unit 112 matches service-identified macroflow configuration information which is input from the service identification unit 114 and a communication quality for each service which is acquired from the individual service requested communication quality DB 113, and outputs macroflow configuration information having a requested communication quality for each microflow.

In the example in FIG. 4, a service of a communication destination of the microflow 1 is identified as a service A, and 20 Mbps and 5 ms are obtained as the requested communication quality for the service A from the individual service requested communication quality DB 113. In this manner, the matching 112 outputs 20 Mbps and 5 ms as the requested communication quality for the microflow 1.

Methods of obtaining a requested communication quality for each service include three methods, that is, "reporting from a service provider," "utilization of user sensation quality evaluation results," and "estimation from past microflow requested communication quality estimation results".

The first method of "reporting from a service provider" is a method in which a service provider registers a necessary communication quality in the individual service requested communication quality DB 113 in advance.

The second method of "utilization of user sensation quality evaluation results" is a method in which a communications carrier measures a user sensation quality of a specific service in advance and registers a requested communication quality based on the result in the individual service requested communication quality DB 113. For example, a relationship between a communication quality of an IP phone and a user sensation quality (an MOS value) is disclosed in Non Patent Literature 2. Using the disclosed technique, a requested communication quality for an IP phone service can be obtained based on a required user sensation quality.

In a case where the requested communication quality for all services cannot be estimated exhaustively even when the above-described two methods are used, the third method of "estimation from past microflow requested communication quality estimation results" is performed. Note that "estimation from past microflow requested communication quality estimation results" may be performed irrespective of whether or not the above-described two methods have been performed.

Figure 5:
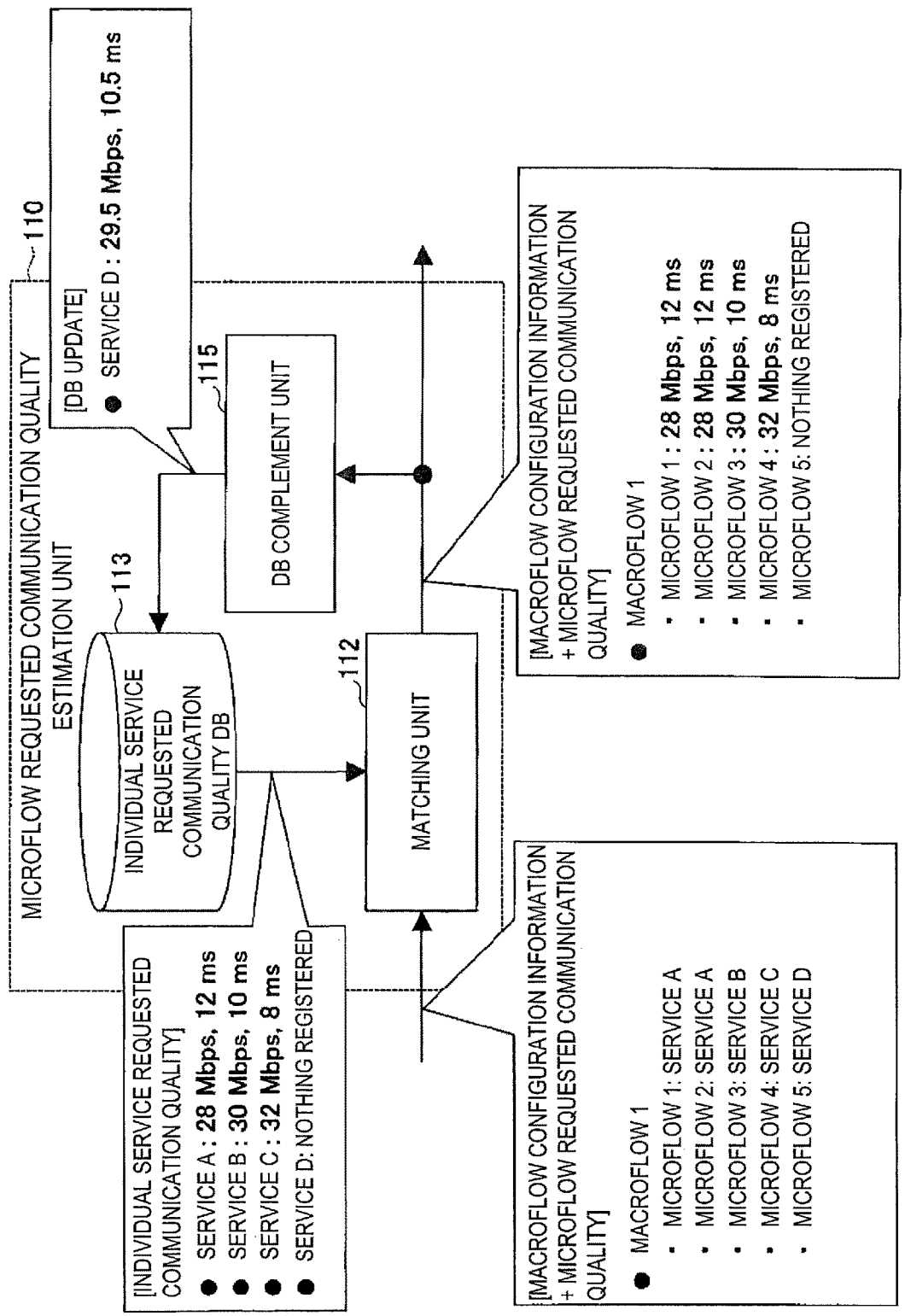
FIG. 5 is a diagram illustrating a DB supplementation method in the operation example 2 of the microflow requested communication quality estimation unit.

The processing of "estimation from past microflow requested communication quality estimation results" is performed by a DB complement unit 115 illustrated in FIG. 5.

As a result of macroflow classification, the requested communication quality for an unknown microflow is considered to be similar to a known requested communication quality when microflow groups having similar requested communication qualities are combined together as the same macroflow. For this reason, as illustrated in FIG. 5, the DB complement unit 115 can complement the individual service requested communication quality DB 113 by estimating the requested communication quality for an unknown microflow from the requested communication qualities for known microflows. In the example in FIG. 5, requested communication quality for a service D, which is a communication destination of the microflow 5, is estimated as 29.5 Mbps and 10.5 ms. Details are as follows.

Whether microflow groups having similar requested communication qualities are combined into the same macroflow is determined in accordance with the magnitudes of variations in requested communication quality values of known microflows. Variations in data can be determined numerically with indexes such as a variance and a standard deviation (the smaller a variance/standard deviation, the smaller a variation in a numerical value). In the case where the variation is small, the requested communication quality for an unknown microflow is estimated based on the requested communication quality values of known microflow groups and is registered in the individual microflow requested communication quality DB 113.

In particular, when the method of Non Patent Literature 1 is used to generate a macroflow, microflow groups having similar requested communication qualities are generated as the same macroflow, and thus this method is considered to be particularly effective.

In the example in FIG. 5, the DB complement unit 115 acquires the requested communication qualities for the respective microflows 1 to 4 constituting the macroflow 1 output from the matching unit 112, as the requested communication qualities for known microflows. In addition, the DB complement unit 115 ascertains that there is no registered requested communication quality for the microflow 5 constituting the macroflow 1.

The DB complement unit 115 calculates both a variance of a requested band and a variance of a requested delay for the microflows 1 to 4, for which the requested communication quality is known, to be approximately 3.67. The DB complement unit 115 compares, for example, a predetermined threshold value and a variance with each other. When it is determined that the variance is smaller than the threshold value, the DB complement unit 115 determines that microflow groups having similar requested communication qualities are classified into the same macroflow. Then, the DB complement unit 115 estimates a requested communication quality value for the microflow 5 (service D) as an average value of items of the microflows 1 to 4 (requested band: 29.5 Mbps, requested delay 10.5 ms), and updates the individual service requested communication quality DB 113 with "service D: 29.5 Mbps, 10.5 ms".

Operation Example of Macroflow Requested Communication Quality Estimation Unit 120

Next, as an operation example of the macroflow requested communication quality estimation unit 120, a requested band estimation method and a requested delay estimation method will be described.

The requested band estimation method includes a requested band estimation method 1 and a requested band estimation method 2.

Macroflow Requested Communication Quality Estimation Unit 120: Requested Band Estimation Method 1

Figure 6:
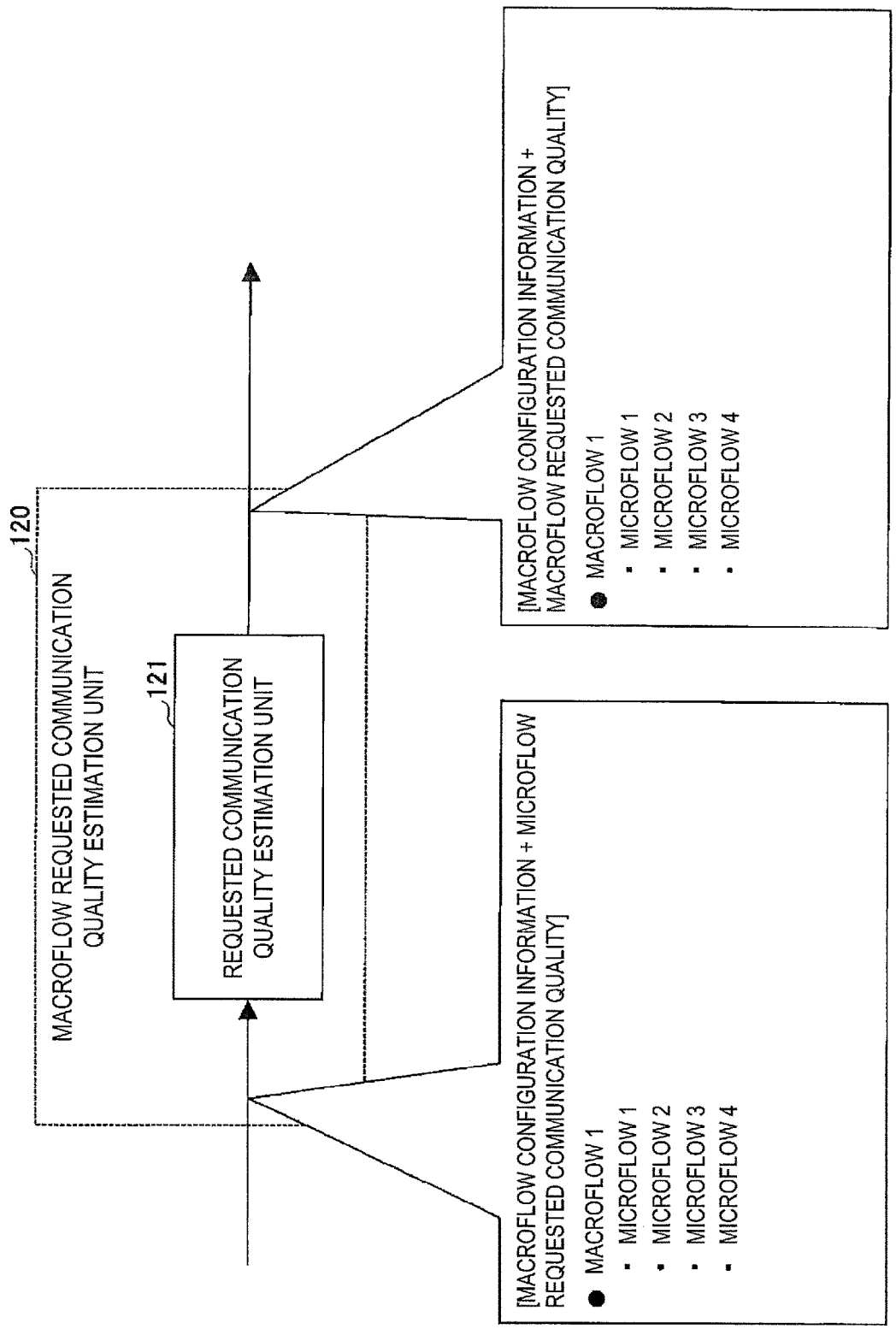
FIG. 6 is a diagram illustrating a requested band estimation method 1 of a macroflow requested communication quality estimation unit.

In the requested band estimation method 1, the requested band for a macroflow is estimated as a total value of requested bands for the microflows. In other words, as illustrated in FIG. 6, a requested communication quality estimation unit 121 included in the macroflow requested communication quality estimation unit 120 calculates a total value of requested bands for the microflows 1 to 4 constituting a macroflow based on an input from the microflow requested communication quality estimation unit 110, and outputs the total value as a requested band for the macroflow.

Macroflow Requested Communication Quality Estimation Unit 120: Requested Band Estimation Method 2

In the requested band estimation method 2, a requested band for a macroflow is estimated from the actual traffic amount for each past macroflow.

In general, the more a plurality of microflows are bundled, the higher the bandwidth utilization rate is due to a large grouping effect, and thus it is assumed that a requested band for a macroflow calculated in the requested band estimation method 1 becomes larger than the band in use.

Consequently, in the requested band estimation method 2, the requested band for the macroflow obtained in the requested band estimation method 1 is corrected.

Figure 7:
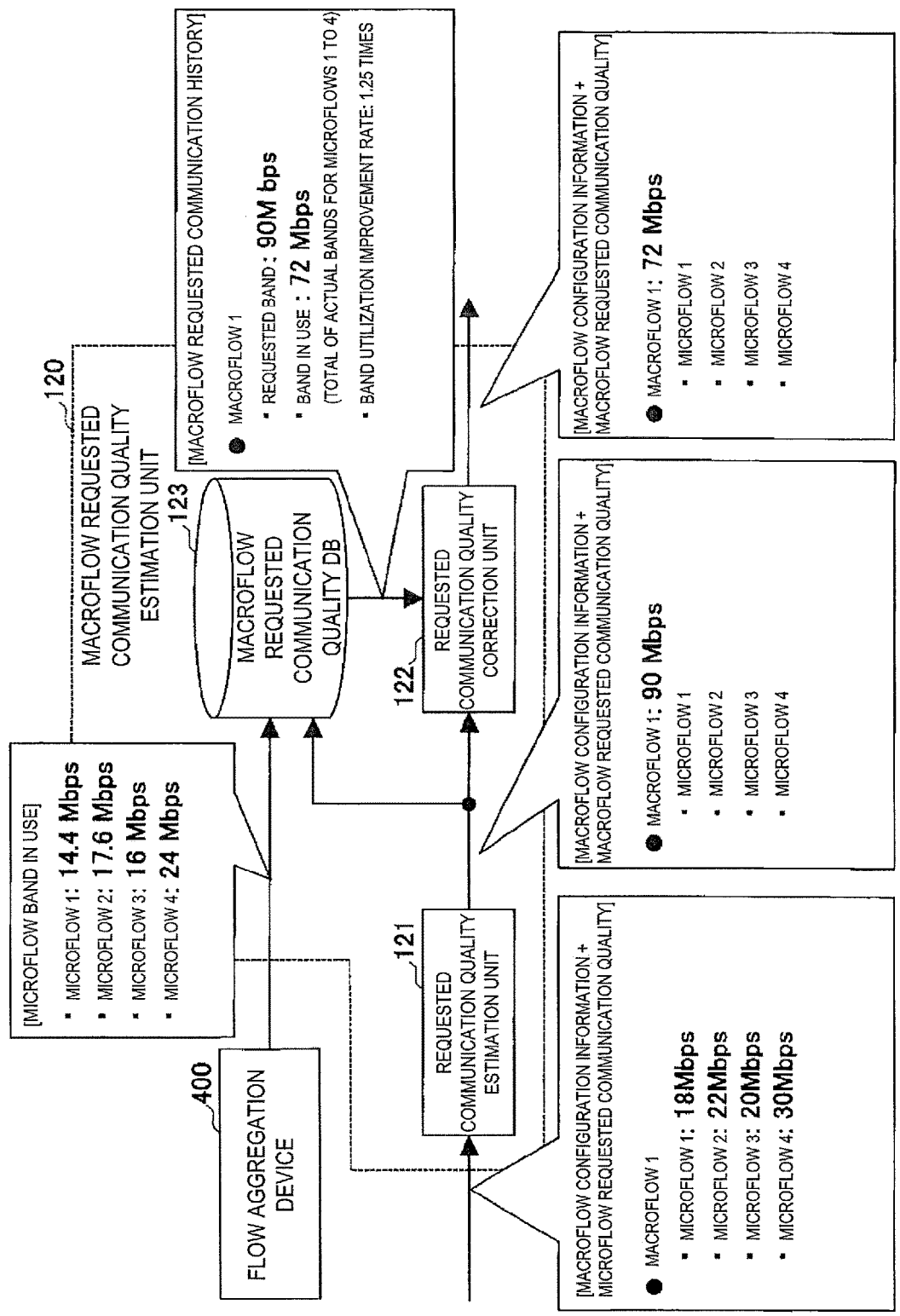
FIG. 7 is a diagram illustrating a requested band estimation method 2 of the macroflow requested communication quality estimation unit.

As illustrated in FIG. 7, the macroflow requested communication quality estimation unit 120 that executes the requested band estimation method 2 includes the requested communication quality estimation unit 121, a requested communication quality correction unit 122, and a macroflow requested communication quality DB 123.

A requested band for each past macroflow (obtained in the requested band estimation method 1 by the requested communication quality estimation unit 121) and the band in use (obtained from the flow aggregation device 400) are stored in the macroflow requested communication quality DB 123. In addition, the macroflow requested communication quality DB 123 calculates and numerically stores a band utilization improvement rate indicating how much a band utilization rate has improved due to a grouping effect. Note that the requested communication quality correction unit 122 may calculate a band utilization improvement rate.

In the example in FIG. 7, the requested band for the past macroflow 1 is 90 Mbps, while the band in use is 72 Mbps, and thus the band utilization improvement rate is 1.25 (=90 Mbps/72 Mbps).

When the requested band for the macroflow 1 calculated by the requested band estimation method 1 is input to the requested communication quality correction unit 122 from the requested communication quality estimation unit 121, the requested communication quality correction unit 122 reads the band utilization improvement rate for the macroflow 1 from the macroflow requested communication quality DB 123, and corrects the requested band for the macroflow 1 obtained in the requested band estimation method 1. In the example in FIG. 7, a requested band of 90 Mbps of the macroflow 1, which is the output of the requested band estimation method 1, is divided by the band utilization improvement rate 1.25 to calculate and output a corrected requested band of 72 Mbps.

Macroflow Requested Communication Quality Estimation Unit 120: Requested Delay Estimation Method In the present embodiment, a requested delay for the macroflow is estimated as a statistical value of a requested delay for a microflow.

Specifically, the requested communication quality estimation unit 121 included in the macroflow requested communication quality estimation unit 120 estimates a requested communication quality value for a macroflow using statistical values of respective requested communication quality values for microflows constituting the macroflow. The statistical values include, for example, an average value, a minimum value, a percentile value, and the like.

A percentile value is a numerical value indicating a number counted from a smaller or larger value (counted from a larger value when applied to a requested delay) with the whole as 100, and the 50th percentile is a median value. When an X percentile value is applied, a requested delay for X percent microflows of a total is satisfied. When X=100, the same result is obtained as when a minimum value is set.

Figure 8:
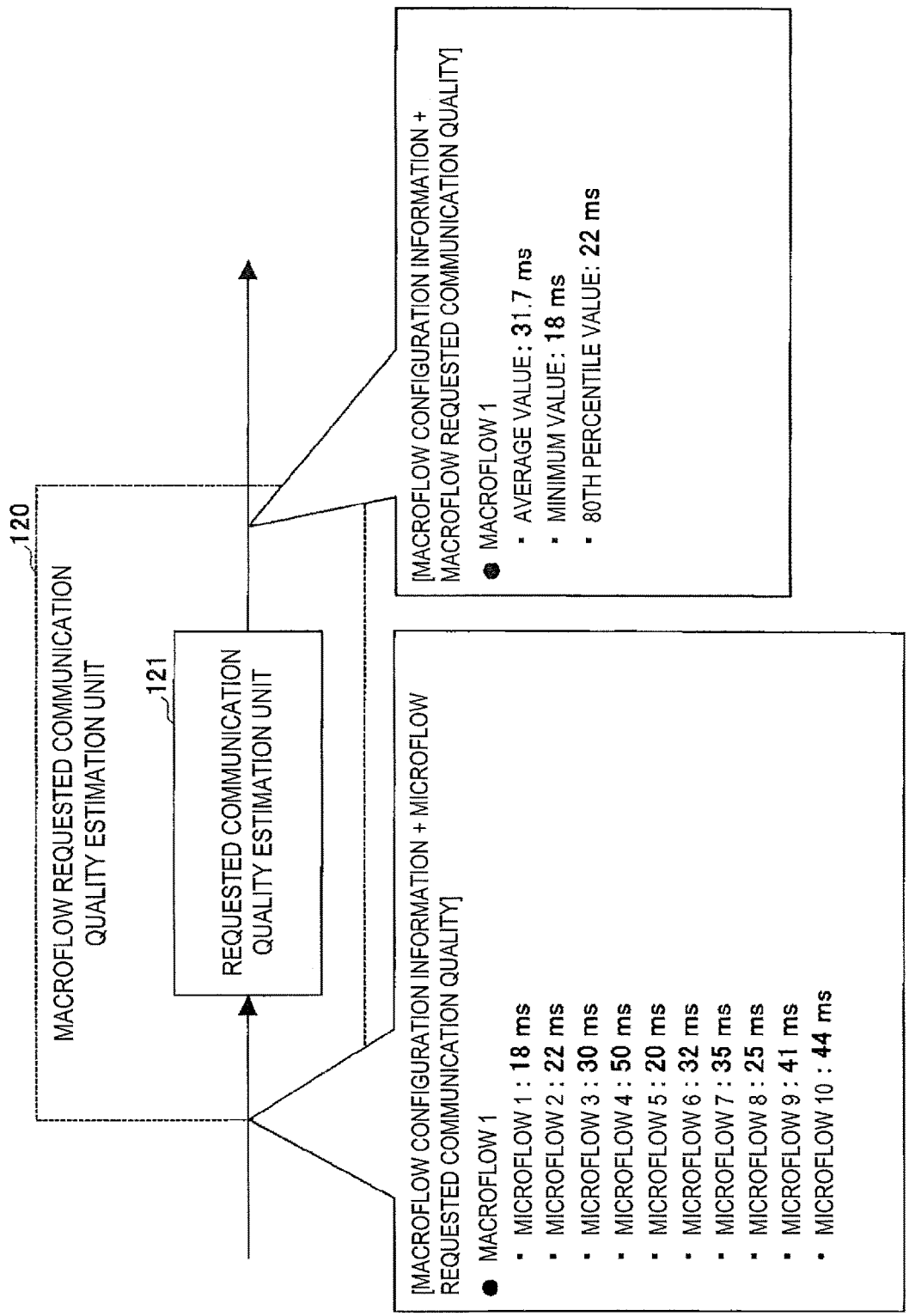
FIG. 8 is a diagram illustrating a requested delay estimation method of the macroflow requested communication quality estimation unit.

In the example illustrated in FIG. 8, a requested delay for each of the microflows 1 to 10 constituting the macroflow 1 is input to the requested communication quality estimation unit 121. The requested communication quality estimation unit 121 calculates and outputs an average value (31.7 ms), a minimum value (18 ms), or an 80th percentile value (22 ms) of requested delays for the microflows 1 to 10 as the requested delay for the macroflow 1. Note that any one or more or all of the average value, the minimum value, and the percentile value may be calculated, and all of the calculated values may be output.

Selection of Requested Communication Quality Estimation Method for Macroflow Basically, any requested communication estimation method among the plurality of requested communication estimation methods described above may be used. However, the following method may be applied. Note that which of the plurality of requested communication estimation methods is to be applied may be set in the macroflow requested communication quality estimation unit 120 through preliminary setting, and the requested communication quality estimation unit 121 may determine which of the plurality of requested communication estimation methods is to be applied, using the following method. Further, a parameter adjustment unit 125 to be described later may determine which of a plurality of requested communication estimation methods is to be applied, using the following method.

Regarding a requested band, since the requested band estimation method 2 includes the requested band estimation method 1, it is sufficient that the requested band estimation method 2 having high estimation accuracy be applied.

On the other hand, regarding a requested delay, a suitable estimation method differs depending on the properties of a macroflow. As an example of an application rule of a requested delay estimation method, there is a determination method that performs determination in accordance with whether microflow groups having similar requested communication qualities are combined into the same macroflow. In a case where microflows having similar requested communication qualities are combined as a macroflow, the variation in the requested communication quality value is small. Thus, regardless of which estimation method is applied, the estimation result does not change greatly, and there are few flows in which quality deteriorates greatly.

On the other hand, regarding a macroflow in which microflows having various communication qualities are combined, the variation in the requested communication quality is large, and thus, in a case where a requested delay estimation method is set to be an average value, there are flows in which the communication quality deteriorates greatly. For this reason, a minimum value and a percentile value may be used to reduce the number of flows in which communication quality deteriorates.

In a case where a requested delay estimation method is set to be an X percentile value, it is important how to determine X. When X=100, the requested communication quality for all flows is satisfied. However, in a case where the remaining band of a network is limited, there is a possibility that path assignment will not be successful. In this case, it is necessary to tolerate a certain degree of flow quality degradation and assign paths. As a requested delay becomes larger, the variation in candidate paths increases, and thus path assignment is more likely to be successful. For this reason, in a case where X is set to a large value and path assignment is not successful, it is only required that X be set to a small value.

Macroflow Requested Communication Quality Estimation Unit 120: Path Calculation Result Feedback Method A method of feeding back path assignment results and adjusting parameters for requested communication quality estimation will be described with reference to FIG. 9.

Figure 9:
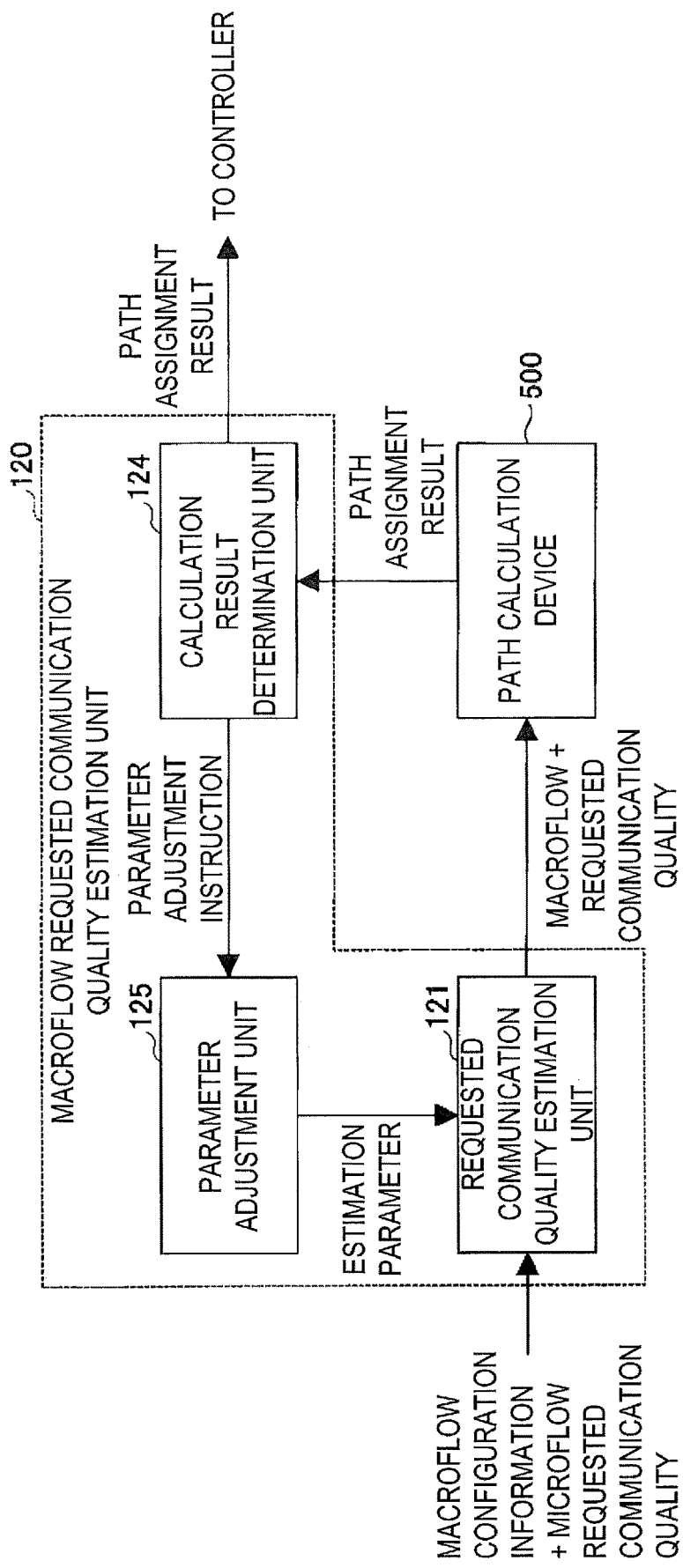
FIG. 9 is a diagram illustrating a path calculation result feedback method of the macroflow requested communication quality estimation unit.

As illustrated in FIG. 9, in a case where parameter adjustment is performed through path calculation result feedback, the macroflow requested communication quality estimation unit 120 includes a calculation result determination unit 124, a parameter adjustment unit 125, and the requested communication quality estimation unit 121.

As illustrated in FIG. 9, the path calculation device 500 calculates a path to be assigned to a macroflow, based on the requested communication quality for the macroflow which is output from the requested communication quality estimation unit 121. The path assignment results are input to the calculation result determination unit 124.

The calculation result determination unit 124 determines whether or not parameter adjustment is necessary, based on results of path calculation. In a case where the calculation result determination unit 124 determines that path assignment has not been successful (in a case where it is determined that parameter adjustment is necessary), the calculation result determination unit 124 transmits a parameter adjustment instruction to the parameter adjustment unit 125. A case where it is determined that parameter adjustment is necessary is, for example, a case where X is excessively large when a requested delay estimation method is set to be an X percentile value, as described above.

The parameter adjustment unit 125 adjusts parameters for requested communication quality estimation and transmits the adjusted parameters to the requested communication quality estimation unit 121. The requested communication quality estimation unit 121 executes requested communication quality estimation and a path calculation instruction again.

In a case where it is determined that path assignment is successful, the calculation result determination unit 124 transmits a path assignment result to the controller 600 and controls the network 200. Although the above-described method has been described as an example of a requested delay estimation method, there is no particular limitation on its application as long as it is applied to a parameter used for requested communication quality estimation.

Example of Hardware Configuration of Device

The requested communication quality estimation device 100 may be a system constituted by a plurality of computers, or may be a device realized by one computer. In addition, the computer may be a physical machine or a virtual machine.

In a case where the requested communication quality estimation device 100 is realized by a computer, the requested communication quality estimation device 100 can be realized by causing hardware resources such as a CPU and a memory incorporated in the computer to execute a program corresponding to processing performed by the requested communication quality estimation device 100. The above-described program can be recorded in a computer-readable recording medium (a portable memory or the like) and stored or distributed. In addition, the above-described program can also be provided through a network such as the Internet or e-mail.

Figure 10:
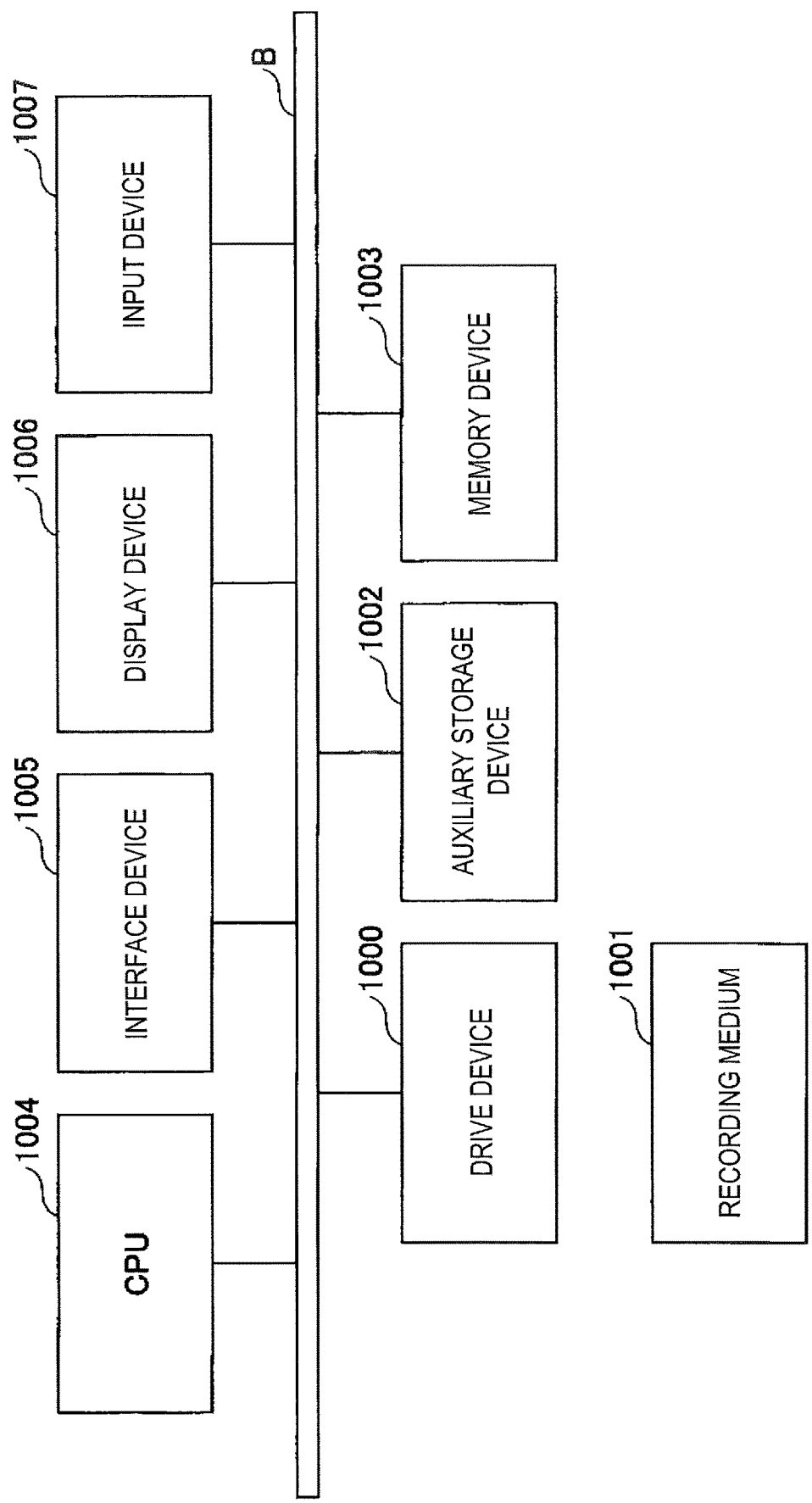
FIG. 10 is a diagram illustrating an example of a hardware configuration of the device.

FIG. 10 is a diagram illustrating an example of a hardware configuration of the above-described computer. The computer in FIG. 10 includes a drive device 1000, an auxiliary storage device 1002, a memory device 1003, a CPU 1004, an interface device 1005, a display device 1006, an input device 1007, and the like which are connected to each other through a bus B.

A program that realizes processing in the computer is provided by, for example, a recording medium 1001 such as a CD-ROM or a memory card. When the recording medium 1001 storing the program is set in the drive device 1000, the program is installed in the auxiliary storage device 1002 from the recording medium 1001 through the drive device 1000. However, the program does not necessarily need to be installed through the recording medium 1001, and may be downloaded from another computer through a network. The auxiliary storage device 1002 stores the installed program and also stores necessary files, data, and the like.

The memory device 1003 reads the program from the auxiliary storage device 1002 and stores the program in a case where an instruction for starting the program is given. The CPU 1004 realizes functions related to the requested communication quality estimation device 100 in accordance with the program stored in the memory device 1003. The interface device 1005 is used as an interface for connecting to a network and functions as an input unit and an output unit through the network. The display device 1006 displays a graphical user interface (GUI) and the like according to the program. The input device 157 is formed of a keyboard and a mouse, a button, a touch panel, or the like, and is used to allow for inputs of various operation commands.

Effects of Embodiment

The requested communication quality estimation device 100 can estimate a requested communication quality for each of a plurality of macroflows, and thus the path calculation device 500 can calculate a path taking the requested communication quality for each of the plurality of macroflows into account, which leads to an improvement in communication quality for a user.

Conclusion of Embodiment

This specification describes at least a requested communication quality estimation device, a requested communication quality estimation method, and a program which correspond to the following items.

Item 1

There is provided a requested communication quality estimation device that estimates a requested communication quality for a macroflow which is a set of microflows, the requested communication quality estimation device including a first estimation unit configured to estimate a requested communication quality for each of a plurality of microflows constituting a macroflow, and a second estimation unit configured to estimate a requested communication quality for the macroflow based on the requested communication quality for each of the plurality of microflows which is obtained by the first estimation unit.

Item 2

In the requested communication quality estimation device according to item 1, the first estimation unit estimates the requested communication quality for each of the plurality of microflows constituting the macroflow based on a requested communication quality registered in advance for each of the plurality of microflows.

Item 3

In the requested communication quality estimation device according to item 1, the first estimation unit identifies a service of a communication destination for each of the plurality of microflows constituting the macroflow, and estimates the requested communication quality for each of the plurality of microflows based on a requested communication quality registered in advance for each service.

Item 4

In the requested communication quality estimation device according to any one of items 1 to 3, the requested communication quality includes a requested band and a requested delay, and the second estimation unit estimates a requested band for the macroflow based on a total of a plurality of the requested bands for the respective microflows constituting the macroflow.

Item 5

In the requested communication quality estimation device according to term 4, the second estimation unit estimates the requested band for the macroflow using a band utilization improvement rate obtained from the total of the plurality of the requested bands for the respective microflows constituting the macroflow and a total of bands in use for the respective microflows.

Item 6

In the requested communication quality estimation device according to any one of terms 1 to 3, the requested communication quality includes a requested band and a requested delay, and the second estimation unit estimates a requested delay for the macroflow based on a statistical value of a requested delay for each of the plurality of microflows constituting the macroflow.

Item 7

There is provided a requested communication quality estimation method executed by a requested communication quality estimation device that estimates a requested communication quality for a macroflow, which is a set of microflows, the requested communication quality estimation method including estimating a requested communication quality for each of a plurality of microflows constituting a macroflow, and estimating a requested communication quality for the macroflow based on the obtained requested communication quality for each of the plurality of microflows.

Item 8

There is provided a program for causing a computer to operate as each of the units in the requested communication quality estimation device according to any one of items 1 to 6.

Although the present embodiment has been described above, the present disclosure is not limited to such a specific embodiment, and various modifications and changes can be made without departing from the gist of the present disclosure described in the claims.

REFERENCE SIGNS LIST

100 Requested communication quality estimation device
110 Microflow requested communication quality estimation unit
111 Individual microflow requested communication quality DB
112 Matching unit
113 Individual service requested communication quality DB
114 Service identification unit
115 DB complement unit
120 Macroflow requested communication quality estimation unit
121 Requested communication quality estimation unit
122 Requested communication quality correction unit
123 Macroflow requested communication quality DB
124 Calculation result determination unit
125 Parameter adjustment unit
200 Network
210 Communication device
300 Flow collecting device
400 Flow aggregation device
500 Path calculation device
600 Controller
1000 Drive device
1001 Recording medium
1002 Auxiliary storage device
1003 Memory device
1004 CPU
1005 Interface device
1006 Display device
1007 Input device

The invention claimed is:

1. A requested communication quality estimation device for estimating a requested communication quality for a macroflow that is a set of microflows, the requested communication quality estimation device comprising:
   a memory;
   processing circuitry electrically coupled to the memory, the processing circuitry being configured to:
      determine communication quality values for a group of known microflows in the macroflow,
      estimate a first requested communication quality for each of microflows in the macroflow, based on the communication quality values for the known microflow group, wherein the estimating includes estimating a communication quality for an unknown microflow in the macroflow, based on the communication quality values for the group of known microflows, and
      estimate a second requested communication quality for the macroflow, based on estimated first requested communication qualities for the respective known and unknown microflows.

2. The requested communication quality estimation device according to claim 1, wherein the memory stores candidate microflows in association with respective third requested communication qualities, and
   wherein the processing circuitry is configured to estimate the first requested communication quality for each of the microflows in the macroflow, based on whether the first requested communication quality matches one of the third requested communication qualities.

3. The requested communication quality estimation device according to claim 1, the memory stores candidate microflows in association with respective third requested communication qualities,
wherein the processing circuitry is configured to:
identify a service of a communication destination for each of the microflows that constitute the macroflow,
determine a third requested communication quality associated with the identified service, by referring to the memory, and
estimate the first requested communication quality for each of the microflows, based on the determined third requested communication quality.

4. The requested communication quality estimation device according to claim 1, wherein each of the first requested communication quality and the second requested communication quality relates to a requested band and a requested delay, and
the processing circuitry is configured to estimate a requested band for the macroflow, based on a total of requested bands for the respective microflows that constitute the macroflow.

5. The requested communication quality estimation device according to claim 4, wherein the processing circuitry is configured to estimate the requested band for the macroflow, based on a band utilization improvement rate, the band utilization improvement rate being determined based on (i) the total of the requested bands for the respective microflows that constitute the macroflow and (ii) a total of bands actually used for the respective microflows.

6. The requested communication quality estimation device according to claim 1, wherein each of the first requested communication quality and the second requested communication quality relates to a requested band and a requested delay, and
the processing circuitry is configured to estimate a requested delay for the macroflow, based on a statistic that is derived from requested delays for the respective microflows in the macroflow.

7. The requested communication quality estimation device according to claim 1, wherein a variation in the communication quality values for the group of known microflows is less than a threshold.

8. A requested communication quality estimation method executed by a device that estimates a requested communication quality for a macroflow that is a set of microflows, the requested communication quality estimation method comprising:
determining communication quality values for a group of known microflows in the macroflow;
estimating a first requested communication quality for each of microflows in the macroflow, based on the communication quality values for the known microflow group, wherein the estimating includes estimating a communication quality for an unknown microflow in the macroflow, based on the communication quality values for the group of known microflows; and
estimating a second requested communication quality for the macroflow, based on estimated first requested communication qualities for the respective known and unknown microflows.

9. A non-transitory computer readable medium storing program that causes a computer to execute the method according to claim 7.

* * * * *